April 20, 1965 J. J. LANE 3,178,848
ANIMATED FISHING LURE
Filed Nov. 4, 1963
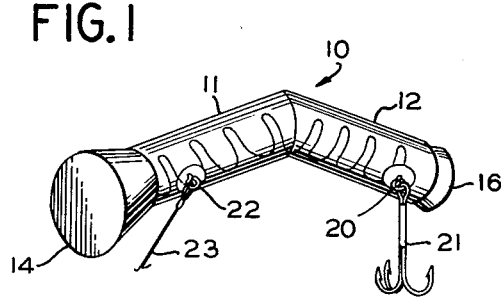
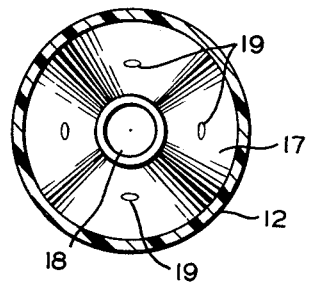
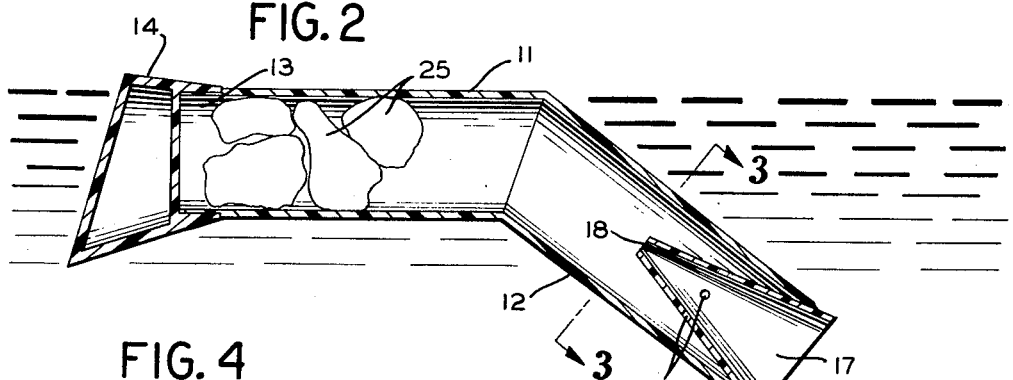
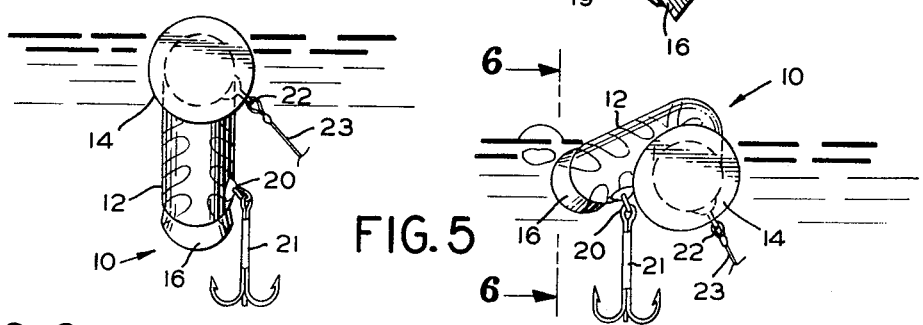
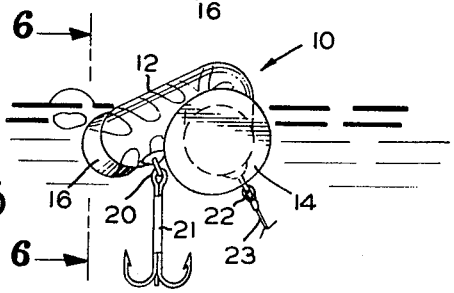
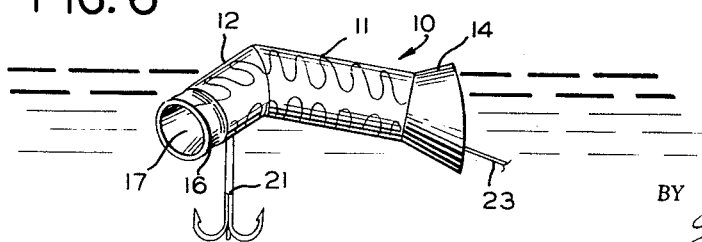
INVENTOR.
JOSEPH J. LANE
BY
*Jansewitz & Carr*
ATTORNEYS

3,178,848
ANIMATED FISHING LURE
Joseph J. Lane, 5132 Casa Oro Drive, Yorba Linda, Calif.
Filed Nov. 4, 1963, Ser. No. 321,175
5 Claims. (Cl. 43—42.06)

This invention pertains to a fishing lure which is self-operated when in the water to impart motion to the lure.

There have been several past proposals for animated fishing lures in efforts to secure a lure more attractive to fish. Generally, it has been attempted to impart some sort of motion to the lure so that it would simulate the appearance of an insect or other natural food of the fish. For the most part, however, the results have not been those hoped for, and the motion of the lure has failed to duplicate that of a live object. Hence, self-animated lures have not given significantly improved fishing results.

The present invention provides a self-animated lure which realistically simulates the action of a struggling insect, providing precisely the type of motion that will attract fish. This is accomplished through the use of a tubular member having two angularly offset portions. One portion includes a conical baffle having apertures at its apex and intermediate the ends, while a quantity of calcium carbide is inserted into the other portion of the lure and capped off. When this tubular member is cast into the water, the water can enter the end of the baffle, causing that portion of the tubular member to pivot downwardly in the water about the axis of the other segment which remains substantially parallel to the surface of the water. When the water reaches the calcium carbide there is a reaction that produces a gas, which then escapes outwardly through the conical baffle, lifting that end of the unit, which again pivots about the axis of the other segment until the gas can escape upwardly to the exterior. Then the cycle repeats as the water again seeps into the interior of the unit. This action continues repeatedly, causing the member to rock about one segment as if it were a struggling insect in the water. One or more hooks are included on the portion that moves up and down in the water, while the line is attached to the other portion of the unit.

An object of this invention is to provide an improved animated fishing lure.

Another object of this invention is to provide a fishing lure having motions realistically duplicating those of a struggling insect or other live object.

A further object of this invention is to provide an animated fishing lure having two segments with provision for oscillation about one segment, while the other moves upwardly and downwardly in the water.

An additional object of this invention is to provide an animated fishing lure of relatively simple low cost construction that is easily and economically operated.

These and other objects will become apparent from the following detailed description taken in connection with the accompanying drawing in which:

FIGURE 1 is a perspective view of the fishing lure of this invention;

FIGURE 2 is an enlarged longitudinal sectional view of the lure with one end rotated downwardly in the water;

FIGURE 3 is an enlarged transverse sectional view taken along line 3—3 of FIGURE 2, showing the conical baffle;

FIGURE 4 is an end elevational view of the arrangement of FIGURE 2;

FIGURE 5 is a view similar to FIGURE 4 but illustrating the lure in the upwardly rotated position; and FIGURE 6 is a side elevational view of the arrangement of FIGURE 5 as viewed along line 6—6 of FIGURE 5.

With reference to the drawing, the device of this invention includes a tubular member 10 made up of segments 11 and 12 which are in an angular relationship with each other. Thus, the sections 11 and 12 meet at an obtuse angle, typically around 130°. The member 10 is hollow and may be made of plastic or other suitable material and provided with appropriate surface markings. The section 11 is adapted to be closed at its end 13 by means of a cap 14 that slides over the end of the section 11 and seals off the interior at that location.

The opposite end portion 12 has an open outer end 16 in which is located a conical baffle 17. This baffle includes an apical opening 18 as well as small openings 19 intermediate the ends of the baffle. There may be four of the openings 19 spaced about a circumference of the conical baffle 17.

On the exterior of the section 12 is a fitting 20 which carries a hook 21. This fitting attaches to the periphery of the section 12 to one side of the plane in which the axes of sections 11 and 12 of the member 10 fall (see FIGURE 4). There may be more than one such hook provided if desired.

Another fitting 22 is carried by the section 11, and to this fitting is attached the fishing line 23.

In operation of the device of this invention, three or four particles 25 of a substance that will react with water to produce a gas are inserted into the section 11, and the end cap 14 is secured in place. Calcium carbide is suitable for this purpose and of a relatively low cost. Such calcium carbide may be retained in place in the section 11 in any suitable way, for example by tightly packing the same in such section 11 to thereby produce a force fit. The lure then is cast into the water. Being a hollow lightweight object, it will tend to float on the surface. However, the water can enter the outer end 16 of the section 12, seeping into the interior of the member 10 through the apertures 19 and finally the opening 18 at the apex of the baffle 17. As this occurs, the outer end portion of the section 12, which already supports the weight of hook 21, grows heavier, and this portion of the unit sinks in the water. However, the other section 11 initially remains comparatively dry as the section 12 first fills with water. Thus, the movement of the section 12 downwardly into the water causes the lure to rotate substantially about the axis of the section 11 that contains the calcium carbide. This enables the portion 11 to remain along the surface of the water, while only the section 12 drops beneath the surface of the water.

As the water enters the unit 10 through the end 16 of the section 12, ultimately it flows into the section 11 where it contacts the calcium carbide particles 25. When this occurs, the reaction of the water and the calcium carbide generates a gas that commences to fill the spaces within the section 11. The gas thus created forces the water in front of it as it seeks to escape the unit 10 and this gas will reach the opening 18 at the apex of the baffle enters the downwardly inclined section 12. Ultimately this gas will reach the opening 18 at the apex of the baffle 17 and then can leave the unit 10 through the outer end 16 of the section 12. As the gas moves in this manner, it forces water out of the section 12, causing this section to become lighter as the gas displaces the water so that the section 12 then moves upwardly in the water. The upward movement is similar to the downward movement in that it is chiefly rotational about the axis of the section 11. Thus, the member 10 rotates to bring the section 12 toward the surface of the water in order to permit a bubble of gas to escape the open end 16 of the section 12. As the gas rushes out of the opening 18 in the conical baffle, water again is free to enter the open end 16 and the interior of the section 12 of the unit. In fact, a certain amount of water will remain in the section 12 despite the movement of the gas as it escapes the section 12, because it cannot be displaced but is trapped in the convergent area outside of the baffle and within the end portion of the section 12. Hence, there is a quantity of water in the end portion of the section 12 so that as soon as the gas leaves the opening 18 the section 12 immediately begins to sink downwardly in the water as before. Again, the water rises in the unit until it contacts the carbide crystals 25, generating the gas for a second time. As before, the unit rotates upwardly, the gas escapes and the cycle is repeated. The lure of this invention keeps up this rotational movement as it continues to oscillate back and forth around the section 11. The movement includes a slight amount of lateral rotation back and forth about the distal end of section 11. Hence, the lure gives a rocking action as successive gas bubbles escape to the surface. This provides a realistic motion that is attractive to fish, simulating the kicking movement of an insect in the water. Not being the conventional linear motion of a lure being towed through the water, the lure of this invention will attract fish more than otherwise could be expected. A soft noise accompanies the outflow of gas, and this too helps bring the fish. The movement of the lure continues for a considerable period of time until the calcium carbide 25 has all been converted into gaseous form from reaction with water.

In order to achieve this realistic movement, however, it is necessary for the unit to have its offset angular relationship of the two segments, while having an appropriate end baffle to permit the water to enter and the gas to escape. The hook 21 should be attached to one side of the plane of the axes of the sections 11 and 12 in order that the lure will oscillate about the section 11, rather than attempting to rise vertically in the water. If the weight imposed on the lure is directly along the plane of the axes, the tendency is toward direct vertical movement bodily of the entire mass of the lure. As a result, little actual motion will be imparted to the lure with such a construction. With the angularly offset sections and the weight at one side, however, the lure has enough buoyant force to rotate about the section 11 as the gas is generated. This gives a maximum amount of movement and a more realistic motion than otherwise is the case.

The foregoing detailed description is to be clearly understood as given by way of illustration and example only, the spirit and scope of this invention being limited solely by the appended claims.

I claim:
1. A fishing lure comprising
a hollow tubular body,
    said body including a first section,
    and a second section,
        said sections connecting at an obtuse angle at their inner ends,
    said first section having a closed outer end,
    said second section having an open outer end,
a conical baffle received in said open outer end
    with the base thereof at said end and the apex thereof inwardly of said end,
    said baffle having an opening therethrough at said apex,
    and additional opening means intermediate said apex and said base,
a quantity of material in said first section capable of reacting with water to generate a gas,
a hook means connected to said second section at one side of a plane containing the longitudinal axes of said first and second sections,
and a fitting on said first section for providing a means for connecting a fishing line to said body.

2. A fishing lure comprising
a hollow tubular member,
    said member having two sections interconnected at an obtuse angle,
a closure for the distal end of one of said sections,
    whereby said end is sealable against ingress of water
    and upon removal of said closure can receive a quantity of a material capable of reacting with water to generate a gas,
a baffle in the distal end of the other of said sections,
    said baffle being of substantially conical configuration convex inwardly,
    said baffle having an opening at the apex thereof and at least one additional opening intermediate said apex and the outer end of said baffle,
and hook means carried by said member,
    said hook means being secured to said other section and on one side of the plane of the longitudinal axes of said sections.

3. A fishing lure comprising
a housing,
    said housing being buoyant
    and including a first substantially straight elongated tubular end portion
    and a second substantially straight elongated tubular end portion,
        said portions being interconnected and angularly offset,
and a material in said first portion capable of reacting with water to generate a gas,
    said second portion having aperture means therein
        for permitting ingress of water to contact said material in said first portion and to cause said second portion to sink beneath the surface of water
        and for permitting egress of gas generated by the reaction of said water and said material to cause said second portion to rise to the surface of the water,
            for thereby imparting rotational movement to said housing substantially about the longitudinal axis of said first portion.

4. A device as recited in claim 3 in which said aperture means includes
a concave member over the outer end of said second portion,
    said concave member having an opening therethrough inwardly of said outer end,
    and at least one additional opening intermediate said first-mentioned opening and said outer end.

5. A fishing lure comprising
a hollow buoyant tubular member,
    said member having two elongated portions interconnected at an obtuse angle,
        the first of said portions having a closed end and being adapted to receive a quantity of material capable of reacting with water to produce a gas,
        the other of said portions having an open end,
and a baffle in said open end, said baffle being convergent inwardly to provide an inner end thereof at a location axially inwardly of said open end of said other portion,
  said baffle having a first opening means at said inner end thereof,
  said baffle having a second opening means outwardly of said inner end thereof and inwardly of said open end of said other section,
  both of said opening means being in communication with the interior of said other section.

References Cited by the Examiner

UNITED STATES PATENTS

| | | | |
|---|---|---|---|
| 2,415,742 | 2/47 | Hiltabidel et al. | 43—42.06 |
| 2,805,511 | 9/57 | Cicala | 43—42.06 |
| 3,096,598 | 7/63 | Smolen | 43—42.06 |

ABRAHAM G. STONE, *Primary Examiner.*